United States Patent Office 3,270,002
Patented August 30, 1966

3,270,002
MONOAZO INDANDIONE CONTAINING DYESTUFFS
Ernest Merian, Bottmingen, Basel-Land, and Otto Senn, Arlesheim, Basel-Land, Switzerland, assignors to Sandoz Ltd. (also known as Sandoz AG.), Basel, Switzerland
No Drawing. Filed Aug. 3, 1962, Ser. No. 214,524
Claims priority, application Switzerland, June 22, 1959, 75,044; Nov. 18, 1959, 80,755
1 Claim. (Cl. 260—193)

The present application is a continuation-in-part of copending application Serial No. 34,388, filed June 7, 1960 (now U.S. Patent No. 3,153,643).

The present invention relates to indandione dyestuffs of the formula

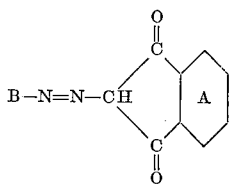

(I)

wherein B is a radical of the formula

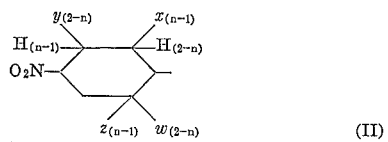

(II)

$x$ represents a member selected from the group consisting of chlorine and bromine,
$y$ represents a member selected from the group consisting of hydrogen, chlorine and bromine,
$z$ represents a member selected from the group consisting of chlorine, bromine, nitro and cyano,
$w$ represents a member selected from the group consisting of chlorine, bromine and cyano,
$n$ is one of the integers 1 and 2,
and the nucleus A is a member selected from the group consisting of phenylene, 5-chlorophenylene and 5,6-dichlorophenylene.

The process for the production of dyestuffs I consists in coupling 1 mol of the diazo compound of an amine of the formula

B—NH$_2$ (III)

with 1 mol of a 1,3-indandione which may contain non-water-solubilizing substituents in the phenylene nucleus or with 1 mol of a compound which is converted into a 1,3-indandione under the operating conditions employed.

The coupling reaction is effected in acid, neutral or alkaline medium at low temperatures, e.g. —5° to 15° C.

Diazo components which are worth special mention as amines of Formula III are:

1-amino-2-chloro- or -bromo-4-nitro-benzene,
1-amino-2,6-dichloro- or -dibromo-4-nitro-benzene,
1-amino-2,5-dichloro- or -dibromo-4-nitro-benzene,
1-amino-2-chloro- or -bromo-4,6-dinitro-benzene,
1-amino-2-cyano-4-nitrobenzene,
1-amino-2-cyano-6-chloro- or -bromo-4-nitro-benzene.

Examples of suitable coupling components, other than 1,3-indandione itself, are monochloro-1,3-indandione, 5,6-dichloro-1,3-indandione, 2-substituted indandiones which under the conditions of application exchange their radical in the 2-position for a phenylazo radical, e.g. 1,3-indandione-2-carboxylic acid and its alkyl esters.

The indandione dyestuffs are brought into a finely divided form by dissolving in a water-miscible solvent, if necessary at elevated temperature, and running the solution into water, upon which the product is filtered off, washed and kneaded with a dispersing agent. The paste formed can be dried at normal or reduced pressure or by nozzle drying. Another method of converting the dyestuffs into a finely divided form is to grind or knead them in the dry or moist state in presence of dispersing agents and if necessary fillers and/or grinding assistants to reduce the particle size, the dyestuff then being dried by one of the drying processes employed in pigment manufacture. The dyestuff preparations thus obtained contain the indandione dyestuffs in particles of the order of magnitude of 1μ.

In certain cases the affinity of the dyestuff preparations can be improved by mixing two or more dyestuffs which have been converted into the finely divided form.

The indandione dyestuffs disclosed herein are suitable for dyeing, padding and printing polyester fibers, in particular the condensation products of terephthalic acid and ethylene glycol which are marketed under the trade names Dacron, Dacron 64, Terylene, Tergal, Terital, Trevira, Kodel, Teron, Fortrel, Vycron, Lanon and Diolen; further the cellulose ester fibers: secondary cellulose acetate and cellulose triacetate; and the synthetic polyamide fibers (nylon 66 and the types marketed under the trade names Perlon, Mirlon, Grilon and Rilsan).

The yellow to orange dyeings, paddings and prints obtained on polyester fibers are notable for their good fastness to light, sublimation and heat setting and their very good washing and perspiration fastness. The dyestuffs reserve wool, cotton and viscose in blended fabrics. This last-mentioned property has become very important as a result of the wide variety of blended fabrics now produced, especially those composed of a polyester fiber and wool. When blended fabrics of this type are dyed with disperse dyestuffs the wool is stained to a considerable depth and as the stain is not fast the goods lose in value. There are no commercially available yellow disperse dyestuffs which give a sufficiently good reserve of wool. A number of the indandione dyestuffs of the present invention are superior to all the known commercial dyestuffs in this respect.

An other advantage of the new dyestuffs is their excellent stability against hydrolysis in water up to 150° C. and in the dry state up to 250° C. Most of the greenish yellow dyestuffs of shade are more or less decomposed when dyed under pressure and/or at higher pH-values. The new dyestuffs are therefore useful for dyeing polyester fibers at the boil in presence of carriers in a wide pH-range, under pressure up to 150° C. and by the Thermosol Process when fixed at 180–230° C.

The dyeings on secondary cellulose acetate and cellulose triacetate have very nearly the same shade as those on polyester fibers and, further, they show good fastness to pleating and gas fumes and are readily dischargeable.

The dyeings on synthetic polyamide fibers are notable for their good to excellent fastness to washing.

In the following examples the parts and percentages are by weight and the temperatures in degrees centigrade.

*Example 1*

17.25 parts of 1-amino-2-chloro-4-nitrobenzene are diazotized in the normal way with 25 parts of 30% hydrochloric acid and 6.9 parts of sodium nitrite. Meanwhile 14.5 parts of 1,3-indandione are dissolved in 200 parts of water and 8 parts of 30% sodium hydroxide solution so that the solution reacts weakly alkaline: this solution is cooled to 0° and the diazo compound is run into it simultaneously with 250 parts of a 10% solution of sodium carbonate. On completion of coupling the precipitated dyestuff is filtered off, washed with water and dried. It is obtained as yellow powder which dissolves in concentrated sulfuric acid to give orange solutions; on purification from alcohol its melting point is 260–263°.

A dyeing preparation is prepared by grinding 1 part of the above dyestuff with 1 part of sodium dinaphthylmethanedisulfonate and 8 parts of water in a ball mill and, drying the resulting paste in a spray drier.

3 parts of this dyestuff preparation of the above dyestuff are pasted with a little cold soft water. Cold soft water is run onto the paste and the dispersion well stirred and added through a sieve to a dyebath of 2 parts of lauryl alcohol sulfonate and 4000 parts of water.

100 parts of a scoured fabric of the polyester fiber Dacron (registred trademark) are entered in the dyebath at 40–50°. The temperature is slowly increased and dyeing continued in presence of 20 parts of an emulsion of a chlorinated benzene in water for 1 to 2 hours at 95–100°. The fabric is then rinsed, soaped, rinsed again and dried. It is dyed a yellow shade which is fast to sublimation and heat setting. Wool present in the dyebath is reserved. The yellow dyeing also possesses good fastness to light, cross dyeing, washing, water, seat water, perspiration and gas fumes and is dischargeable white.

The chlorinated benzene can be replaced by 5 parts of 2-hydroxy-1,1'-diphenyl or the dyeing carried out without a carrier at 120° in 30 minutes under pressure.

*Example 2*

The dyestuff described in Example 1 can also be obtained as follows: 21.4 parts of the sodium salt of 1,3-indandione-carboxylic acid ethyl ester are dissolved by boiling for the a short time in 300 parts of acetone with the addition of 300 parts of concentrated hydrochloric acid. The yellow solution formed is cooled to 10° and coupled with the diazo solution prepared as described in Example 1. The precipitated dyestuff is filtered, washed and dried.

In the table below details are given of further examples of indandione dyestuffs which can be produced by the operating procedures of Examples 1 and 2. The diazo component has the general formula

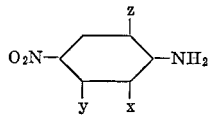

In columns 2, 3 and 4 the substituents $x$, $y$ and $z$ are listed, in column 4 the coupling components and in column 5 the uncorrected melting point of the indandione dyestuffs. All the dyestuffs listed give on Dacron yellow dyeings with similar properties.

| Example No. | $x$ | $y$ | $z$ | Coupling Component | Melting Point, deg. |
|---|---|---|---|---|---|
| 3 | Cl | H | Cl | 1,3-indandione | 228–229 |
| 4 | Br | H | Br | do | 224–225 |
| 5 | Cl | H | NO$_2$ | do | 247–249 |
| 6 | Br | H | NO$_2$ | do | 257–259 |
| 7 | H | H | CN | do | 281–282 |
| 8 | Cl | H | CN | do | 226–228 |
| 9 | Br | H | CN | do | 273 |
| 10 | H | H | Cl | 5,6-dichloro-1,3-indandione | 240–242 |

Further useful dyestuffs according to the invention are the following:

2-(2',5'-dichloro-4'-nitrophenylazo)-1,3-indandione,
2-(2'-chloro-4'-nitrophenylazo)-5-chloro-1,3-indandione and
2-(2'-cyano-4'-nitrophenylazo)-5-chloro-1,3-indandione.

Formulae of representative dyes of the foregoing examples are as follows:

*Examples 1 and 2*

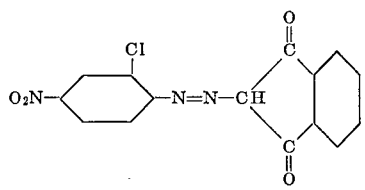

*Example 6*

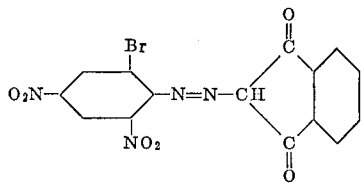

*Example 7*

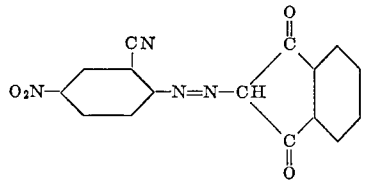

Having thus disclosed the invention what we claim is:
The indandione dye of the formula

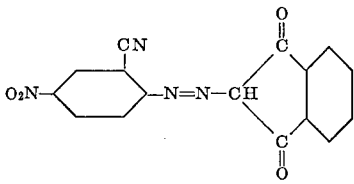

References Cited by the Examiner

UNITED STATES PATENTS

| 1,075,305 | 10/1913 | Schmidt | 260—193 |
| 2,339,739 | 1/1944 | Blackshaw et al. | 8—1 |
| 2,658,889 | 11/1953 | Goldberg et al. | 260—193 |
| 2,782,189 | 2/1957 | Merian | 260—207.5 |
| 2,891,942 | 6/1959 | Merian | 260—157 |
| 2,918,344 | 12/1959 | Jenny | 8—39 |
| 3,093,437 | 6/1963 | Merian et al. | 260—193 |

FOREIGN PATENTS 692,648  6/1940  Germany.

CHARLES B. PARKER, *Primary Examiner.*

NORMA S. MILESTONE, REYNOLD J. FINNEGAN, DONALD M. PAPUGA, *Assistant Examiners.*